May 24, 1960 R. W. DEVER 2,937,487
LEG SHEATH
Filed Feb. 21, 1958
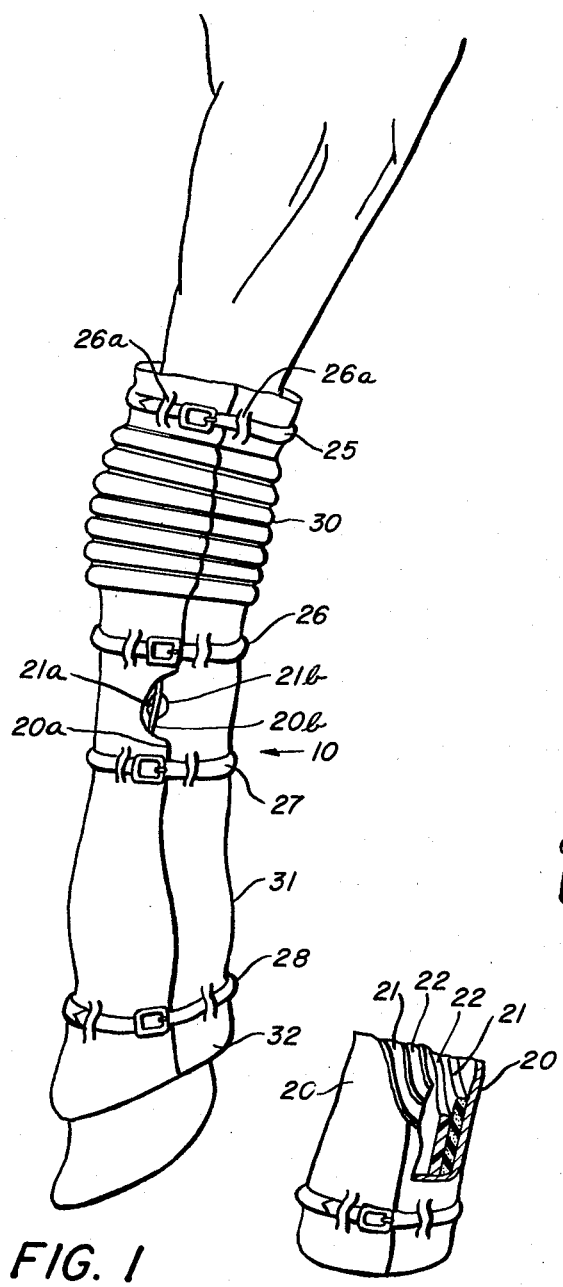
FIG. 1
FIG. 2
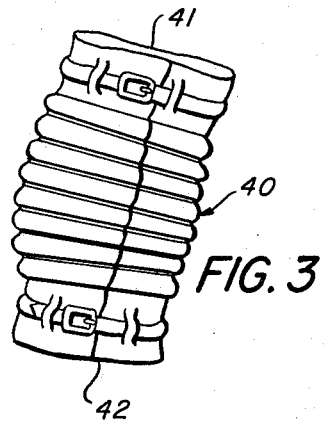
FIG. 3
FIG. 4
INVENTOR.
ROBERT W. DEVER
BY
J. William Freeman
ATTORNEY United States Patent Office 2,937,487
Patented May 24, 1960

2,937,487
LEG SHEATH
Robert W. Dever, 463 Spaulding St., Akron, Ohio
Filed Feb. 21, 1958, Ser. No. 716,725
2 Claims. (Cl. 54—82)

This invention relates to protective covering for appendages and in particular, has reference to a new and improved type of laminate sheath having particular utility as a protective covering for the leg of a horse.

In the past, it has been found that the leg of a horse is highly susceptible to injury during the moving of the horse in a horse van, for example. To remedy this, in the past, it has been common practice to wrap the legs of a horse with a tape and to further protect the appendages of the horse by use of a sponge or other type of cushion that would be applied over the tape and then held in place with additional tape.

While the above type of protective wrapping has served, to some extent, to protect the appendages of a horse during transporting thereof, it has been found that this known method of wrapping involves several disadvantages.

First and foremost of the disadvantages encountered is the fact that the wrapping operation is an extremely time-consuming operation because of the difficulty involved in wrapping the individual limbs of the horse.

Secondly, this wrapping is oftentimes accomplished under the most difficult situations, especially if the horse is temperamental and inclined to rear or kick during the wrapping operation.

As a third and salient disadvantage of the known prior art type of protective wrapping, it has been found that the wrapping will invariably become loosened during transportation and will slip or fall down on the leg to a position around the tarsal joints of the horse with the result that the upper extremity of the leg becomes unprotected so that in spite of the protective wrapping operation, certain vital portions of the horse's limbs will be exposed and frequently damaged.

It has been found that the aforementioned difficulty can be obviated by providing a laminated leg sheath that may be formed in the shape of a free-standing tubular member so as to encircle the leg of a horse, with the sheath being relatively fixed on the horse's leg due to the axially inflexible nature of the same in its tubular form.

It has been further discovered that if a sheath is made up of laminae of different resilient properties, that the sheath itself can possess a multiple of desired qualities, with the free-standing form of the same being effectuated by the use of a relatively rigid, but yieldable, outer sheet, while the shock-absorbing qualities of the same can be obtained by using a cushioned or more highly resilient type of inner sheet designed for application directly against the leg of the horse involved.

It accordingly becomes the principal object of this invention to provide a laminated sheath for use on the leg of a horse that is characterized by the fact that same is easily applied about the leg of a horse and will not materially shift position during application thereof on the leg of a horse.

It is a still further object of this invention to provide a new and improved type of free-standing leg sheath that is capable of being readily attached to the leg of a horse, and which is characterized by the presence of a cushion type of inner liner whereby blows against the external surface of the sheath will not have the full force transmitted to the leg of the horse.

It is a still further object of this invention to provide a new and improved type of leg shield that is contoured in form so as to fit directly over the appendages and any projections that may exist on the same, with such snug fit assuring relative stability of the sheath on the leg of the horse regardless of the activity of the horse.

These and other objects of the invention will become more apparent upon a reading of the following brief specification, considered and interpreted in the light of the accompanying drawings.

Of the drawings:
Figure 1 is a perspective view showing the improved leg sheath applied about the leg of a horse.
Figure 2 is a partial view of the lowermost region of the leg sheath and being cut away to show the cross-sectional construction thereof.
Figure 3 is a perspective view of the modified form of the invention.
Figure 4 is a similar perspective view of a still further modified form of the invention.

Referring now to the drawings, and in particular to Figure 1 thereof, the improved leg sheath, generally designated by the numeral 10, is shown contoured for application around the leg of a horse so as to protect the leg portion from a point below the tarsal joint to a point above the ankle joint.

Considering Figure 2 of the drawings for a detailed consideration of the cross-sectional configuration of laminated sheath 10, it will be seen that the preferred embodiment illustrated herein contemplates the providing of a laminated sheath that includes an outer sheet 20, to which are laminated liner sheets 21 and 22; the arrangement being such that the outer sheet 22 is preferably molded or otherwise formed of a vinyl dispersion product such as "duralastic" made commercially by duPont and possessing a free-standing quality while having the general properties of vulcanized rubber. Similarly, the layer 21 is preferably made from a sheet of foam rubber of like material, while the liner sheet 22 is normally a thin sheet of smooth material for direct application against the surface of the leg portion being covered.

In manufacturing practice, the sheath 10 will generally be made in a flat form so as to have a generally quadrilateral configuration in the flat form, with it being possible to roll the sheath 10 into the tubular form shown in Figure 1 whereby the same may be applied and retained around the leg of a horse by the use of the usual strap members 25, 26, 27 and 28, with the strap members 25 and 26 being disposed above and below the ankle joint respectively, while the lower strap members 27 and 28 are disposed above and below the tarsal joint in the particular form disclosed. With regard to the application of the strap members, it is to be noted that the outer sheet 20 has struck portions 26a, 26a provided so as to permit interlacing of the individual straps 25, 26, 27 and 28 therethrough, as is clearly shown in the drawings.

In order to facilitate an exact fit around the appendage of the horse involved, the sheath 10 is shown including a pleated section 30, an enlarged diameter section 31 and a flared lower section 32, with the pleated section 30 being designed to be received around the ankle section of the horse, while the sections 31 and 32 respectively encircle the tarsal and hoof portions of the leg.

In this manner, and as a result of the exact contoured arrangement just described, the overall sheath is prevented from shifting axially on the leg of the horse, while the provision of the pleated or accordion type knee joint 30 facilitates flexing of the horse's knee during the period that the leg sheath 10 is applied thereover.

In order to facilitate complete overlapping of the edge portions of the sheath 20, while permitting a flush abutment of the edges of the inner sheet 21, the edge portion 21a of sheet 21 is shown spaced with respect to the edge portion 20a of outer sheet 20 and in this manner, when the edge portion 20b of sheet 20 is overlapped as shown in Figure 1, the edge surfaces 21a and 21b of the liner sheet 21 will be in abutment so as to cause complete encirclement of the horse's leg despite the overlapping relationship between the edge surfaces of the outer sheet 20.

The modified form of the invention shown in Figure 3 of the drawings, is, in reality, a segment of the just-described sheath 10 that has been illustrated in Figures 1 and 2 of the drawings, and accordingly, where indicated, like numerals designate like parts. However, because this modified form of leg sheath, indicated generally by the numeral 40, is intended for covering of the ankle joint only, the same is shown as being of reduced axial length in its tubular form so as to define opposed axial ends 41 and 42 that respectively are positioned above and below the ankle joint of the horse being protected.

By like token, the leg sheath 50 illustrated in Figure 4 of the drawings is intended for covering of the tarsal joint of the horse's leg and accordingly, extends upwardly to define an axial end 51 that will be positioned just below the ankle of the horse during use, while the opposed axial end 52 extends below the tarsal joint as is believed apparent from an examination of the drawings.

It will be seen from the foregoing that there has been provided a new and novel type of protective covering for use on the leg of a horse, and it has been shown how the protective covering disclosed herein is easy to apply and remove with the result that the same can be positioned on the leg of a horse with a minimal amount of effort.

It has been further shown how the fact that the sheath is contoured for reception about the appendage operates to obviate shifting of the same, with the result that the horse's leg is protected at all times.

While a full and complete disclosure of the invention has been made in accordance with the dictates of the patent statutes, it is not intended that the invention should be so limited.

Accordingly, where such terms as "plastic," "rubber," "foam rubber," etc. has been used, it is to be understood that equivalent materials may be substituted.

Accordingly, modifications of the invention may be resorted to without departing from the spirit hereof or the scope of the appended claims.

What is claimed is:

1. A laminated sheath for protecting the projecting joints of a horse's leg, comprising; an outer sheet formed of generally flat, rectangular configuration and being adapted to be rolled into tubular form for encirclement around said leg; a liner sheet laminated to said outer sheet and conforming substantially to the contour thereof; a second inner liner sheet laminated to said first mentioned liner sheet and conforming substantially to the contour thereof; and means for retaining said transversely opposed edge portions of said laminated sheath together; said outer sheet having a lesser degree of resilience than said inner lining sheet; said outer sheet having a plurality of parallel pleats formed therein; said pleats encircling said projecting joint when said sheath is positioned in encirclement around said leg, whereby said sheath may be adjusted axially of said leg while said pleated region thereof is maintained in protective encirclement around said projecting joint.

2. A laminated sheath for protecting the projecting joints of a horse's leg, comprising; an outer sheet formed of generally flat, rectangular configuration and being adapted to be rolled into tubular form for encirclement around said leg; a liner sheet laminated to said outer sheet and confirming substantially to the contour thereof; a second inner liner sheet laminated to said first mentioned liner sheet and conforming substantially to the contour thereof; and means for retaining said transversely opposed edge portions of said laminated sheath together; said outer sheet having a lesser degree of resilience that said inner lining sheet; said outer sheet having a transversely extending cavity formed therein; said transverse cavity forming a radial cavity that is received about said projecting joint of said horse when said sheath is positioned in encirclement around said leg; said radial cavity obviating shifting of said sheath on said leg; said outer sheet having a plurality of transversely extending parallel pleats formed therein; said pleats encircling said projecting joint when said sheath is positioned in encirclement around said leg, whereby said sheath may be adjusted axially of said leg while said pleated region thereof is maintained in protective encirclement around said projecting joint.

References Cited in the file of this patent

UNITED STATES PATENTS

| Number | Name | Date |
|---|---|---|
| 235,447 | Milliman | Dec. 14, 1880 |
| 487,296 | Rowell | Dec. 6, 1892 |
| 1,417,742 | Keller | May 30, 1922 |
| 1,706,709 | Rubin | Mar. 26, 1929 |
| 2,194,921 | Wagner | Mar. 25, 1940 |
| 2,280,025 | Bollinger | Apr. 14, 1942 |